(12) United States Patent
Fritz et al.

(10) Patent No.: US 6,257,641 B1
(45) Date of Patent: Jul. 10, 2001

(54) ARRANGEMENT FOR CONTACTING ELECTRONIC COMPONENTS IN A REMOVABLE VEHICLE SEAT

(75) Inventors: Karl-Heinz Fritz, Dettenhausen; Thomas Geisel, Rottenburg; Bernhard Holzapfel, Remshalden; Sabine Schoeber, Remscheid, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/174,241

(22) Filed: Oct. 15, 1998

(30) Foreign Application Priority Data

Oct. 16, 1997 (DE) .............................. 197 45 652

(51) Int. Cl.$^7$ ...................................................... B60N 2/00
(52) U.S. Cl. ...................... 296/65.03; 439/34; 297/217.3
(58) Field of Search .............................. 296/65.01, 65.03; 297/217.3; 439/34

(56) References Cited

U.S. PATENT DOCUMENTS

| | | | |
|---|---|---|---|
| 4,691,946 | * | 9/1987 | Sburlati et al. ............... 296/65.03 X |
| 4,830,422 | * | 5/1989 | Levitre ............................. 296/65.03 |
| 5,167,421 | | 12/1992 | Yunzhao ......................... 296/68.1 X |
| 5,340,185 | | 8/1994 | Vollmer ............................ 296/68.1 |
| 5,498,051 | * | 3/1996 | Sponsler et al. ................. 296/65.03 |

FOREIGN PATENT DOCUMENTS

| | | |
|---|---|---|
| 196 44 219 C1 | 1/1997 | (DE) . |
| 43 20 626 C2 | 8/1997 | (DE) . |
| 0 855 308 A1 | 7/1998 | (EP) . |
| 188668 | 7/2000 | (JP) . |
| 310134 | 11/2000 | (JP) . |

* cited by examiner

*Primary Examiner*—Dennis H. Pedder
(74) *Attorney, Agent, or Firm*—Evenson, McKeown, Edwards & Lenahan, P.L.L.C.

(57) ABSTRACT

An arrangement for contacting of electronic components (for example, seat occupation detection sensors, buckle switches) in a removable vehicle seat which can be mechanically detached from its vehicle-body-side anchoring by means of a seat unlocking device. In order to unlock the seat, a plug-type connection must first be separated manually by the operator. Only then will the unlocking of the seat be released. In another embodiment, an electric plug-type connection is provided which, during the installation and removal of the seat, automatically makes or breaks contact because of the relative movement of the seat.

4 Claims, 2 Drawing Sheets

ARRANGEMENT FOR CONTACTING ELECTRONIC COMPONENTS IN A REMOVABLE VEHICLE SEAT

BACKGROUND AND SUMMARY OF THE INVENTION

This application claims the priority of German patent document 197 45 652.9, filed Oct. 16, 1997, the disclosure of which is expressly incorporated by reference herein.

The invention relates to an arrangement for assuring electrical contact with electronic components in a removable vehicle seat.

In vehicles with removable seats, particularly front passenger seats with a locking device which facilitates mechanical detachment of the seat from its vehicle body anchoring, assuring reliable contact of electronic devices on or in the seat side is problematic. This is particularly important for those components with a safety-relevant function which influences the triggering of air bags (such as a seat occupation recognition function, a child seat recognition function, a buckle switch function, etc.). In addition, a seat heater may need to be contacted.

In a known arrangement of the above-mentioned type, an electric plug-type connection forms an electric disconnecting point, particularly a signal disconnecting point. It is arranged, for example, in the lateral area of the seat on the center dome or on the B-column, and connects the seat-side electronic components to the vehicle-body-side loom of cables. In order to bridge the adjusting range of the seat in the longitudinal direction of the vehicle, the contacting arrangement of the plug-type connection is constructed, at least on one side, as a flexible cable (cable tail).

In such configurations, however, the problem occurs that it is easy to neglect to separate the plug-type connection prior to removal of the seat. Since comparatively high mechanical forces may occur during the removal of the seat, this omission may result in a destruction of the plug-type connection.

It is an object of the invention to provide a connection arrangement which avoids unintentional destruction of the plug-type connection during the removal of the seat.

This and other objects and advantages are achieved by the connection arrangements according to the invention in which the plug-type connection must first be disconnected manually by the operator in order to unlock the seat. Only then will the unlocking of the seat be released. This effectively prevents a plug-type connection which accidentally was not disconnected from being destroyed by the forces occurring during the removal of the seat. The apparatus is reasonable in cost, robust and not very susceptible to becoming dirty.

In one embodiment of the invention, an electric plug-type connection is provided which, during the installation and removal of the seat, is automatically contacted or decontacted by the relative movement of the seat. Destruction of the plug-type connection during removal of the seat is prevented because the movement of the seat, until the plug-type connection is separated, is guided by means of suitable guiding devices along a contacting trajectory adapted to the plug-type connection. Another advantage of this embodiment is the fact that, during the installation of the seat, the electronic devices contained therein are automatically put in contact with the vehicle-body-side loom of cables.

Other objects, advantages and novel features of the present invention will become apparent from the following detailed description of the invention when considered in conjunction with the accompanying drawings.

DETAILED DESCRIPTION OF THE DRAWINGS

Figure 1:
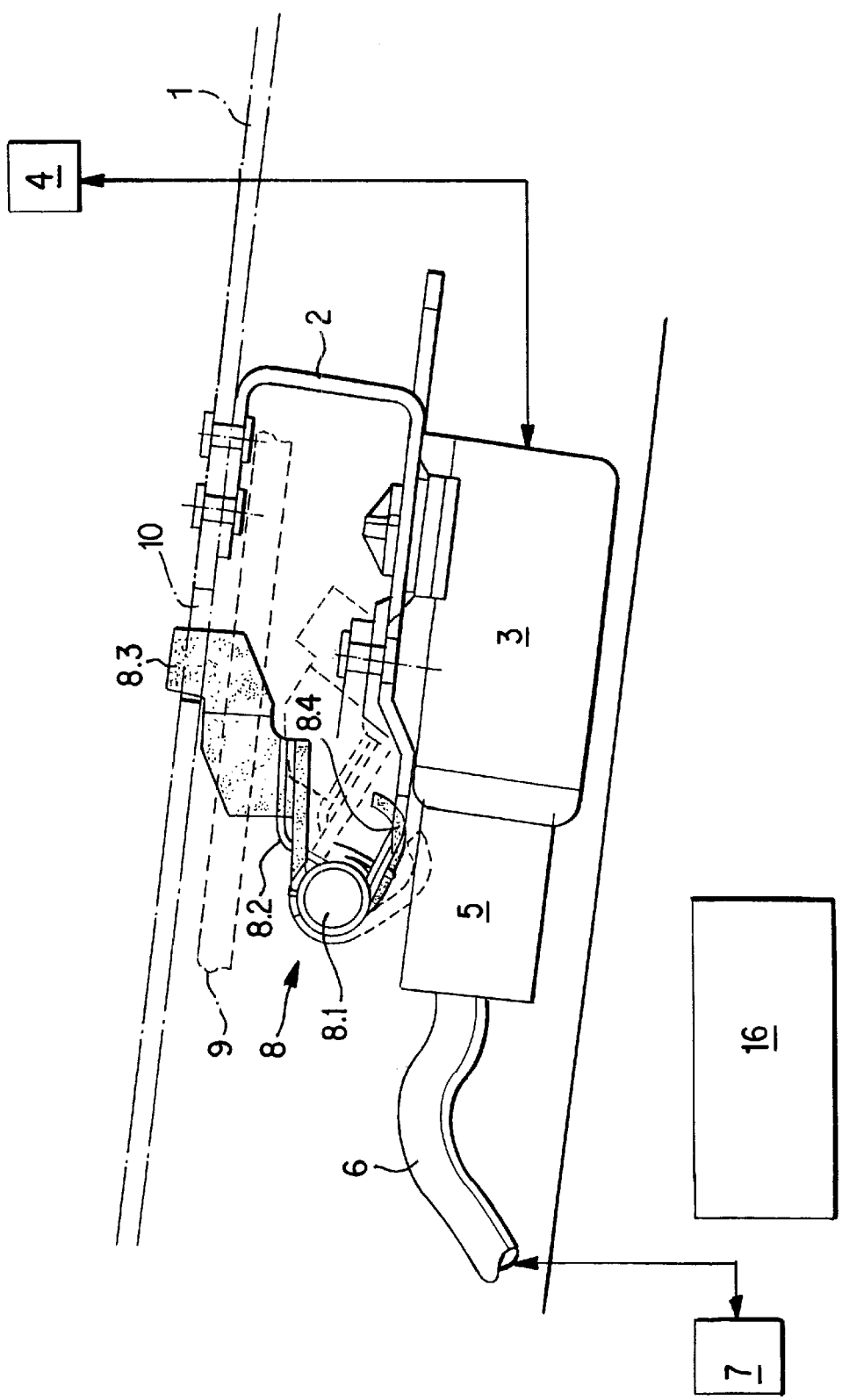
FIG. 1 is a view of a first embodiment of the arrangement according to the invention.

FIG. 1 is a view of a detail, from the floor area, of a seat having a seat rail which is used for anchoring the seat in the vehicle. Normally, for displaceably fastening the seat, a pair of seat rails moving in one another is provided. One rail is fixed to the vehicle body; the other is fixed to the seat and can be longitudinally displaced with respect to the rail fixed to the vehicle body.

In the embodiment illustrated in FIG. 1, the illustrated rail 1 is formed by the seat-side rail. A first connection part is constructed as a socket 3, and is fastened to the rail 1 by means of a bow 2. This first connection part is electrically connected with the seat-side electronic components 4 (such as a seat occupation detection sensor or a buckle switch). A second connection part constructed as a plug 5 can be fit into the socket 3, and is electrically connected by way of a vehicle-body-side loom of cables (cable tail 6) with vehicle-body-side electronic components 7 (such as an air bag control unit).

Furthermore, a safety device 8 is provided which comprises a hinge pin 8.1, a spring 8.2, and a locking arm 8.3 with a molded-on locking cam 8.4. The locking cam 8.4 can be operated together with, the locking arm 8.3, by plugging-in and unplugging the plug 5.

When the plug 5 is fitted in, the locking arm 8.3 is swivelled into a blocking position by way of the locking cam 8.4, thereby blocking operation of a seat unlocking catch 9, which enables release from its anchoring and is part of a seat unlocking device (not shown). When the plug is pulled (that is, the plug-type connections 3, 5 are separated), the locking arm 8.3, supported by the spring 8.2, changes into a release position (indicated by a broken line), in which operation of the seat unlocking catch 9 (and thus an unlocking of the vehicle seat) is released.

For the mechanical support of the locking arm 8.3 in the blocking position, it can be provided that this locking arm 8.3 engages in a window 10 of the seat rail 1.

The arrangement according to the invention ensures that the plug-type connection 3, 5 must be manually separated before the unlocking of the seat. By blocking the unlocking mechanism by means of the safety device 8, unlocking of the vehicle seat is effectively prevented when the plug-type connection 3, 5 is not separated.

In an advantageous further development embodiment (not shown), it may be further provided that the unlocking device is released only when the plug 5 and the cable tail 6 are deposited in a defined inoperative position, particularly in a storage compartment 16 (shown schematically in FIG. 1). A corresponding modification of the safety device 8 can easily be carried out by a person skilled in the art. Such a further development has the advantage that the operator is forced to store the plug 5 and the cable tail 6, so that they are protected from dirt and damage.

Another advantageous embodiment, which may be combined with the above-mentioned further embodiment, consists of providing a storage compartment, in which, after the removal of the seat, the cable tail 6 can be stored together with the plug 5, with a simple ejection mechanism that is automatically triggered during the installation of the seat and ejects the cable tail 6 together with the plug 5. This requires that the operator fit together the plug-type connection parts 3, 5 and contact the seat-side electronic components 4.

As an alternative to the embodiment illustrated in FIG. 1, the invention can also be applied to a construction in which the rail 1 is formed not by the seat-side rail, but by the vehicle-body-fixed rail of the pair of seat rails, initially mentioned. The socket 3 will then be connected with vehicle-body-side electronic components and the plug 5 will be connected with seat-side electronic components. All above-suggested and advantageous measures according to the invention can also be applied to this configuration.

Figure 2:
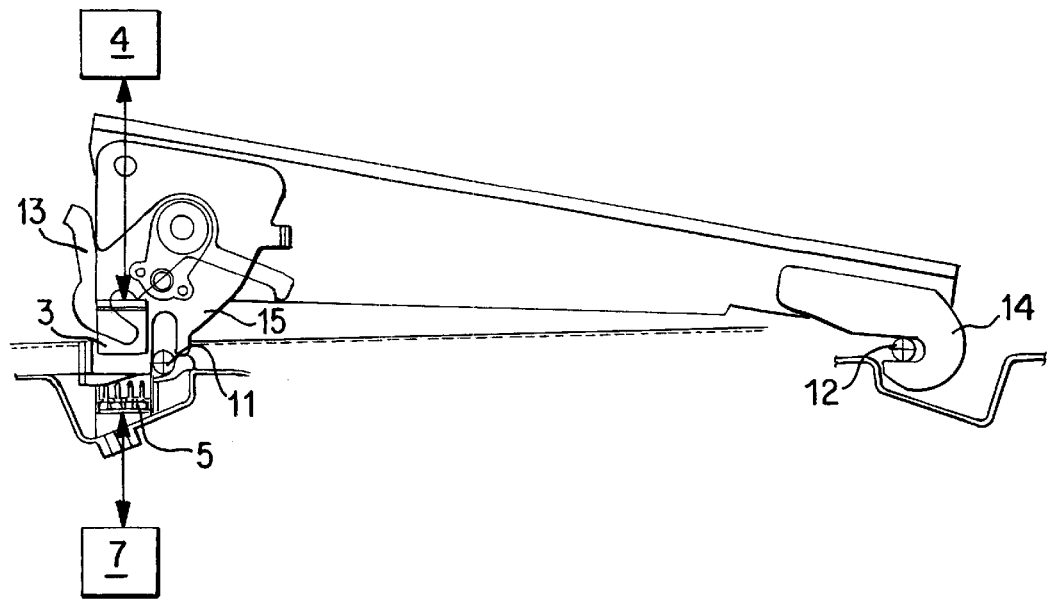
FIG. 2 is a view of a second embodiment of the arrangement according to the invention.
Figure 3:
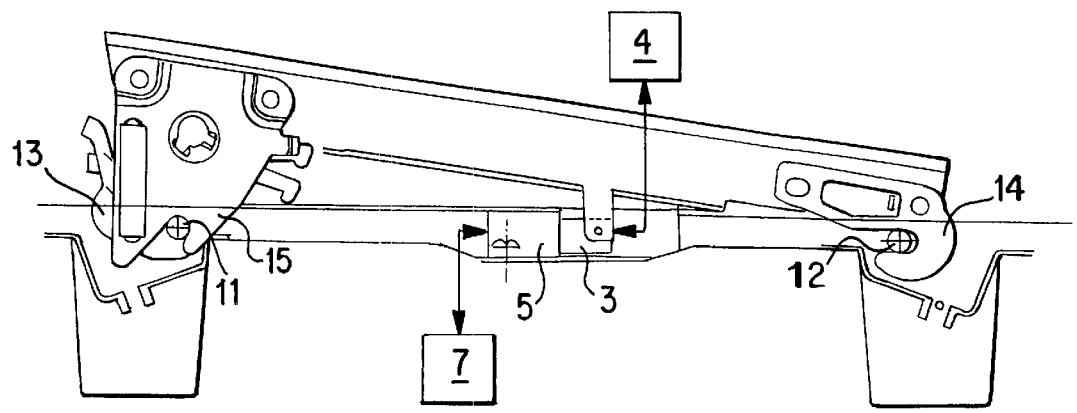
FIG. 3 is a view of a third embodiment of the arrangement according to the invention.

FIGS. 2 and 3 are lateral views of the substructure of a vehicle seat with parts of the seat unlocking device. FIG. 2 shows an unlocked seat and FIG. 3 shows a locked seat. The position symbols for the plug-type connection parts 3, 5 and the electronic components 4, 7 were retained. In the illustrated view, the seat unlocking device comprises anchoring bolts 11, 12 which are fixed to the vehicle body, and seat-side locking bars 13, 14, 15. One locking bar is constructed as a swing-type locking bar 13 which, in the locked position, reaches around the one anchoring bolt 11. The locking bars 14, 15 are constructed as guide slots which are open on one side. In this case, the guide slots are arranged and dimensioned such that, in an interaction with the respective anchoring bolts 11, 12, the seat is guided relative to the vehicle body along a defined contacting trajectory. With respect to the direction and length, the contacting trajectory is adapted to the plug-type connection 3, 5 and its arrangement such that, when the seat is unlocked, the seat-side plug-type connection part 3 is separated, without destruction, from the vehicle-body-side plug-type connection part 5. FIG. 2 illustrates an embodiment with a predominantly vertical contacting trajectory and FIG. 3 illustrates an embodiment with a predominantly horizontal contacting trajectory.

The embodiments in FIGS. 2 and 3 have the advantage that they also permit an automatic closing of the plug-type connection 3, 5 during the installation of the seat and movement of the swing-type locking bar 13 in the closed position. Contacting with the seat-side electronic component is therefore always ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for contacting of electronic components in a removable vehicle seat which can be mechanically detached from vehicle-body-side anchoring by means of a seat unlocking device, the arrangement comprising a plug-type connection, having:

a first plug-type connection part which is arranged on the vehicle body, and is connected with a vehicle-body-side loom of cables;

a second plug-type connection part which is arranged on the vehicle seat, and is connected with the seat-side electronic components; and a safety device which is adapted to act upon the seat unlocking device and which is positively coupled with the plug-type connection, said safety device blocking operation of the seat unlocking device when said first and second connection parts are connected together and releasing operation of the seat unlocking device only when the first and second connection parts are separated.

2. Arrangement according to claim 1, wherein:

the seat unlocking device has a manually operable seat catch whose operation releases the vehicle seat from its anchoring; and the safety device has a locking arm which, in a blocking position positively blocks movement of the seat catch, by means of the relative movement occurring during establishment of the plug-type connection between the two plug-type connection parts, the locking arm being movable into the blocking position by means of a locking cam and being movable out of the blocking position by the separation of the plug-type connection.

3. Arrangement according to claim 2, further comprising:

a storage compartment, in which, after the removal of the seat, the cable tail with the plug can be stored.

4. Apparatus for connecting electric components in a vehicle seat which is removably mounted on a vehicle body, with electrical elements on the vehicle body, comprising:

a first connecting plug mountable to the vehicle seat and electrically connected with said electrical components;

a second connecting plug mountable to the vehicle body and electrically connected to said electrical elements, said first and second plugs being connectable to form an electrical connection therebetween;

an locking arm which is movable between a first position in which a release of said vehicle seat from said vehicle body is blocked, and a second position in which release of said vehicle seat is enabled; and a locking cam disposed on said locking arm, which locking cam bears against a component of one of said first and second plugs, moving said locking arm into said first position, when said first and second plugs are connected; and a resilient member which moves said locking arm into said second position when said first and second plugs are not connected.

\* \* \* \* \*